(12) United States Patent
Gort-Barten et al.

(10) Patent No.: US 6,513,966 B1
(45) Date of Patent: Feb. 4, 2003

(54) ELECTRIC BLENDER WITH SAFETY INTERLOCK ARRANGEMENT

(75) Inventors: Leslie Alexander Gort-Barten, London (GB); Dale Bevington, London (GB)

(73) Assignee: Dualit Limited, London (GB)

( * ) Notice: Subject to any disclaimer, the term of this patent is extended or adjusted under 35 U.S.C. 154(b) by 0 days.

(21) Appl. No.: 09/807,100

(22) PCT Filed: Jun. 2, 2000

(86) PCT No.: PCT/GB00/02132
§ 371 (c)(1),
(2), (4) Date: Jul. 13, 2001

(87) PCT Pub. No.: WO01/10276
PCT Pub. Date: Feb. 15, 2001

(30) Foreign Application Priority Data

Aug. 5, 1999 (GB) .............................. 9918356

(51) Int. Cl.[7] .................. A47J 43/046; B02C 23/04
(52) U.S. Cl. ................. 366/205; 366/206; 241/37.5
(58) Field of Search ................. 366/205, 206, 366/314, 601; 99/348; 241/37.5

(56) References Cited

U.S. PATENT DOCUMENTS

| 1,997,873 | A | * | 4/1935 | Poplawski |
| 2,284,155 | A | * | 5/1942 | Landgraf |
| 3,128,996 | A | * | 4/1964 | Kuzara |
| 3,315,946 | A | * | 4/1967 | Nissman |
| 3,612,126 | A | * | 10/1971 | Emmons et al. |
| 3,713,628 | A | * | 1/1973 | Christensen |
| 3,785,579 | A | * | 1/1974 | Voglesonger |
| 3,786,999 | A | * | 1/1974 | Cabell |
| 3,892,365 | A | * | 7/1975 | Verdun |
| 4,107,791 | A | * | 8/1978 | Mikituk |
| 4,108,054 | A | * | 8/1978 | Klocker et al. |
| 4,111,372 | A | * | 9/1978 | Hicks et al. |
| 4,200,240 | A | * | 4/1980 | Machuron |
| 4,213,569 | A | * | 7/1980 | Amiot |
| 4,216,917 | A | * | 8/1980 | Clare et al. |
| 4,269,519 | A | * | 5/1981 | Birr |
| 4,297,038 | A | * | 10/1981 | Falkenbach |
| 4,335,860 | A | * | 6/1982 | Grandal et al. |
| 4,371,118 | A | * | 2/1983 | Sontheimer et al. |
| 4,373,677 | A | * | 2/1983 | Kunihiro |
| 4,396,159 | A | * | 8/1983 | Podell |
| 4,487,509 | A | * | 12/1984 | Boyce |
| 4,506,836 | A | * | 3/1985 | Williams |

(List continued on next page.)

FOREIGN PATENT DOCUMENTS

| EP | 257705 | * | 3/1988 |
| EP | 571348 | * | 11/1993 |
| EP | 638273 | * | 2/1995 |
| GB | 22249368 | * | 5/1992 |

*Primary Examiner*—Charles E. Cooley
(74) *Attorney, Agent, or Firm*—Lahive & Cockfield, LLP

(57) ABSTRACT

An electric blender comprises a base unit including an electric motor, a connecting line for connecting the motor to a power supply, a separate glass container incorporating rotatable blades and engageable with the base unit so that the motor, when connected to the power supply will drive the blades, a lid for closing the container but separable therefrom, and interlock switch in said connecting line operable between closed and open conditions, the switch being normally biased to its open condition and an enabling member integral with the lid and arranged to operate the switch to the closed condition only when the container and its lid are correctly engaged with one another and the container is engaged with the base unit. The base unit includes an upwardly extending stalk in which the switch is located an an actuator movable vertically in the stalk acting between the projection and the switch and movable to 4 mm beyond the position in which it first operates the switch to the motor enabled condition, so as to accommodate tolerance variations in the container height. The projection and actuator also interengage in such a manner as to accommodate lack of concentricity of the glass container.

6 Claims, 6 Drawing Sheets

U.S. PATENT DOCUMENTS

Figure 1:
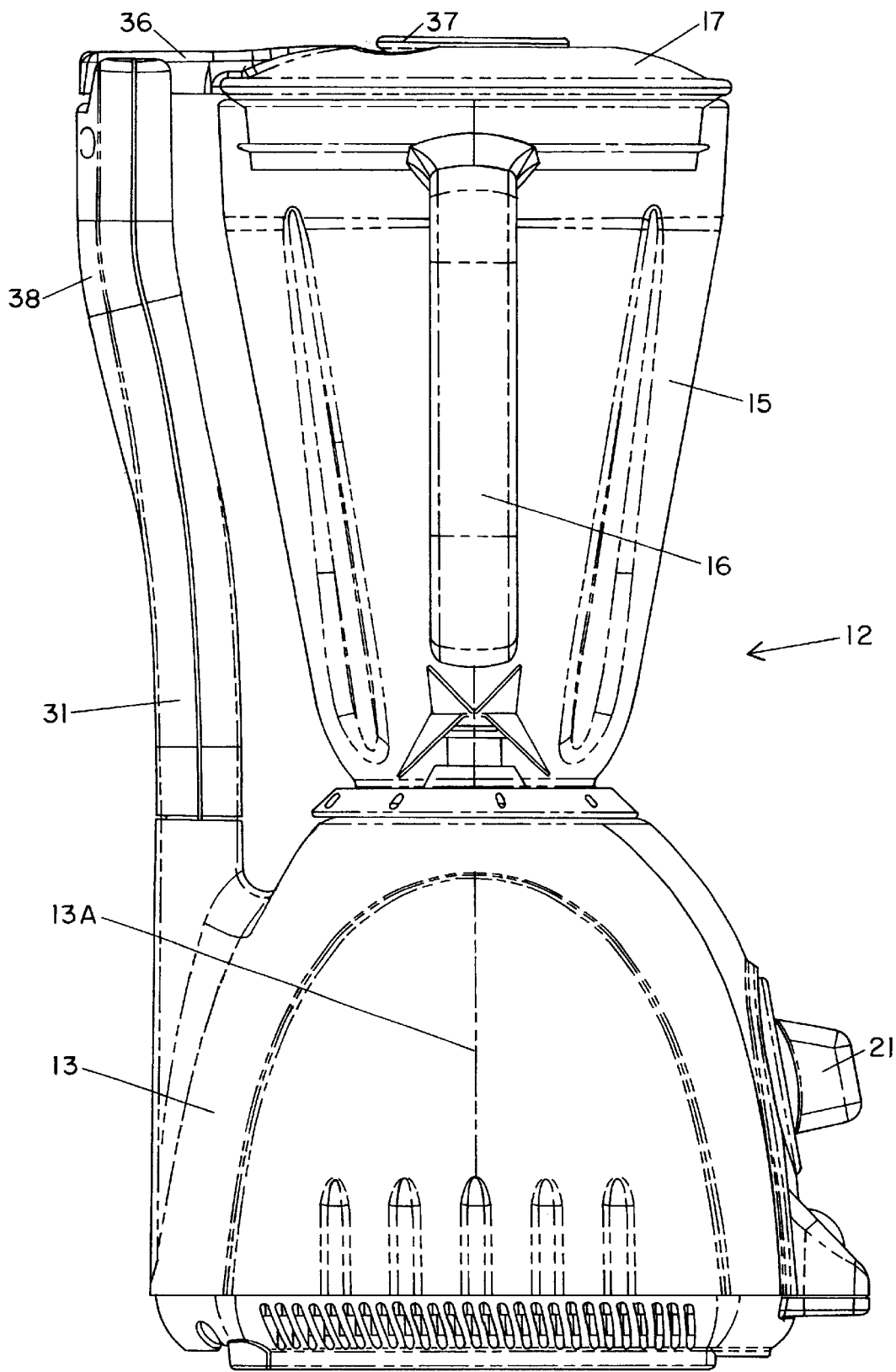

| | | | | |
|---|---|---|---|---|
| 4,629,131 A | * | 12/1986 | Podell |
| 4,691,870 A | * | 9/1987 | Fukunaga et al. |
| 4,741,482 A | * | 5/1988 | Coggiola et al. |
| 5,323,973 A | * | 6/1994 | Ferrara, Jr. |
| 5,338,111 A | * | 8/1994 | Trocherie et al. |
| 5,353,697 A | * | 10/1994 | Venturati et al. |
| 5,567,049 A | * | 10/1996 | Beaudet et al. |
| 5,639,161 A | * | 6/1997 | Sirianni |
| 5,779,358 A | * | 7/1998 | Bevington |
| 5,809,872 A | * | 9/1998 | Sundquist |
| 6,112,649 A | * | 9/2000 | Jeong |
| 6,186,425 B1 | * | 2/2001 | Celso De Almeida Mattos |
| 6,209,810 B1 | * | 4/2001 | Brisard |
| 6,350,053 B1 | * | 2/2002 | Morin |
| 2002/0012288 A1 | * | 1/2002 | Masip et al. |
| 2002/0071340 A1 | * | 6/2002 | Juriga |

* cited by examiner

ELECTRIC BLENDER WITH SAFETY INTERLOCK ARRANGEMENT

BACKGROUND OF THE INVENTION

This invention relates to an electric blender, normally for use in the kitchen. Such blenders are well known and comprise a base unit including a drive motor for rotating a number of blades in a container for holding the material to be blended.

There is a potential danger if the blades can be rotated when the top of the container is fully open because a hand or the like may be inserted into the container in an attempt to insert produce to be blended into it or to push such produce towards the blades.

It is known for example from GB-A-2134804 for a blender to include a switch means which disables the motor if the jug container is not present on the base unit. However, the means for enabling the motor comprises a projection on the base of the handle of the container jug and this does not ensure that the jug is effectively closed against insertion of a hand.

It is also known from U.S. Pat. No. 5,779,358 to disable the motor in a blender if the weight on the base unit is not sufficient. However, again this does not ensure that an effectively closed container is present.

It is also known, for example, from U.S. Pat. Nos. 4,111,372, 4,373,677, 5,323,973, 4,200,240 and EP-A-0257705, for the base unit to include an upwardly extending projection or stalk extending substantially to the height of the container when located on the base unit, in which switch means is located, which switch means is biased to a position in which it disables the drive motor but which is operable by the correct positioning of a lid on the container to enable the motor. The lid is assumed to be at a given height, accurately defined in relation to the switch means, and in most of the above examples is rotated when at this height to the correct enabling position. While the switch operating probe on the lid may, for example as in the case of U.S. Pat. No. 4,111,372 move downwardly as the lid is correctly positioned, so as to move a switch button downwardly to operate the switch, there is no provision for a broad tolerance range in the correct lid height. This would in practice be unnecessary in the case of the blender of U.S. Pat. No. 4,111,372, because the container is made of plastics material which can be manufactured t close tolerances and the container height is less than its diameter.

We have found that using a glass container, which preferably has a height greater than its largest diameter, the manufacturing tolerances tend to provide products having heights which may be 2 mm smaller or larger than that specified and errors in concentricity up to 4 mm either side of that specified. If such a glass container is provided with a lid arranged to interact with an enabling/disabling switch in an upward projection from the base, a rotational movement of the lid is unreliable in operating the switch. A downward movement of an operating member on the lid may also be unsatisfactory since if the container is higher than that specified the operating member may not reach the switch contact, while if the container is shorter than specified, engagement of the operating member with the switch contact may prevent proper closure of the lid. The operating member may also be displaced sideways from the position of the switch due to the lack of concentricity.

SUMMARY OF THE INVENTION

The present invention relates to an electric blender with a safety interlock that prevents the motor of the blender from being operated unless the container is on the base unit with the lid properly positioned thereto. The electric blender of the present invention includes a base unit incorporating an electric motor and a separable container in the form of a glass jug having a handle and a removal lid. The base unit includes a hollow upstanding projection at one side. This projection extends to a height just above the level of or substantially level with the top of the container without the lid. The interlock switch includes a leaf spring connection arm that is located in the hollow upstanding projection that connects to a control circuit between the motor and a power source. The interlock switch is normally in an open condition so that the motor is disabled as the motor does not receive power. A closed topped actuator is mounted in an upper portion of the hollow upstanding projection for vertical movement and is biased upwardly away from the leaf spring arm by an internal spring. The actuator is movable downwardly to flex the spring arm substantially horizontally to effectively close the interlock switch to enable a condition allowing the motor to be connected to the power source upon closure of an on/off switch. The lid includes an arm having a downwardly extending switch operating projection such that when the container is located on the base unit, and the lid is correctly engaged with top of the container, the projection engages a plunger and presses it into a position in which the interlock switch is moved to the enabled condition.

An object of the present invention is to provide a blender which includes safety switch means which prevent the motor being operated unless the container is on the base unit and its lid is correctly positioned. A further object is to provide such a blender in which a safety switch will be operated despite tolerance differences in the height and preferably also the concentricity of the container.

Accordingly, in a preferred form, the invention provides an electric blender comprising a base unit having an electric motor and an upwardly extending projection, connecting means for connecting the motor to a power supply, a separate glass container incorporating rotatable blades and engageable with the base unit so that the motor, when connected to the power supply will drive the blades, a lid for closing an open end of the container but separable therefrom, interlock switch means located in the projection and operable between conditions in which the motor is enabled or disabled with the interlock switch means biased to the motor disabled condition, a downwardly extending operating member integral with the lid and arranged to operate the interlock switch means to the motor-enabled condition in a safe condition when the separate glass container and the lid are correctly engaged with one another and the separate glass container is engaged with the base unit, an actuator movable substantially vertically within the projection and extending between the operating member and the interlock switch means in the safe condition, wherein the interlock switch means has a switch arm which comprises a flexible leaf spring movable substantially horizontally by direct interaction with the actuator on downward movement of the actuator, and wherein the substantially horizontal movement of the flexible leaf spring closes the interlock switch means to place the motor in a motor enabling condition and in which the actuator is arranged to operate the interlock switch means to the motor-enabled condition despite variations in the height and preferable also the concentricity of the separate glass container.

Preferably the actuator is arranged to first contact the switch to move it to enabled condition when the lid is correctly positioned on a container which has a height above the specified height, for example 2 mm above that height, and the actuator can move downwardly, preferably 4 mm, past that position in which it first contacts the switch.

The head of the actuator has sufficient dimensions horizontally that it will be contacted by the operating member in the safe condition despite horizontal variations in the position of the lid by up to 8 mm.

The plunger has sufficient dimensions horizontally that it will be contacted by the operating member in the safe condition despite horizontal variations in the position of the lid by up to 8 mm.

One embodiment of electric blender, in accordance with the invention, will now be described, by way of example only, with reference to the accompanying drawings of which:

BRIEF DESCRIPTION OF THE INVENTION

Figure 2:
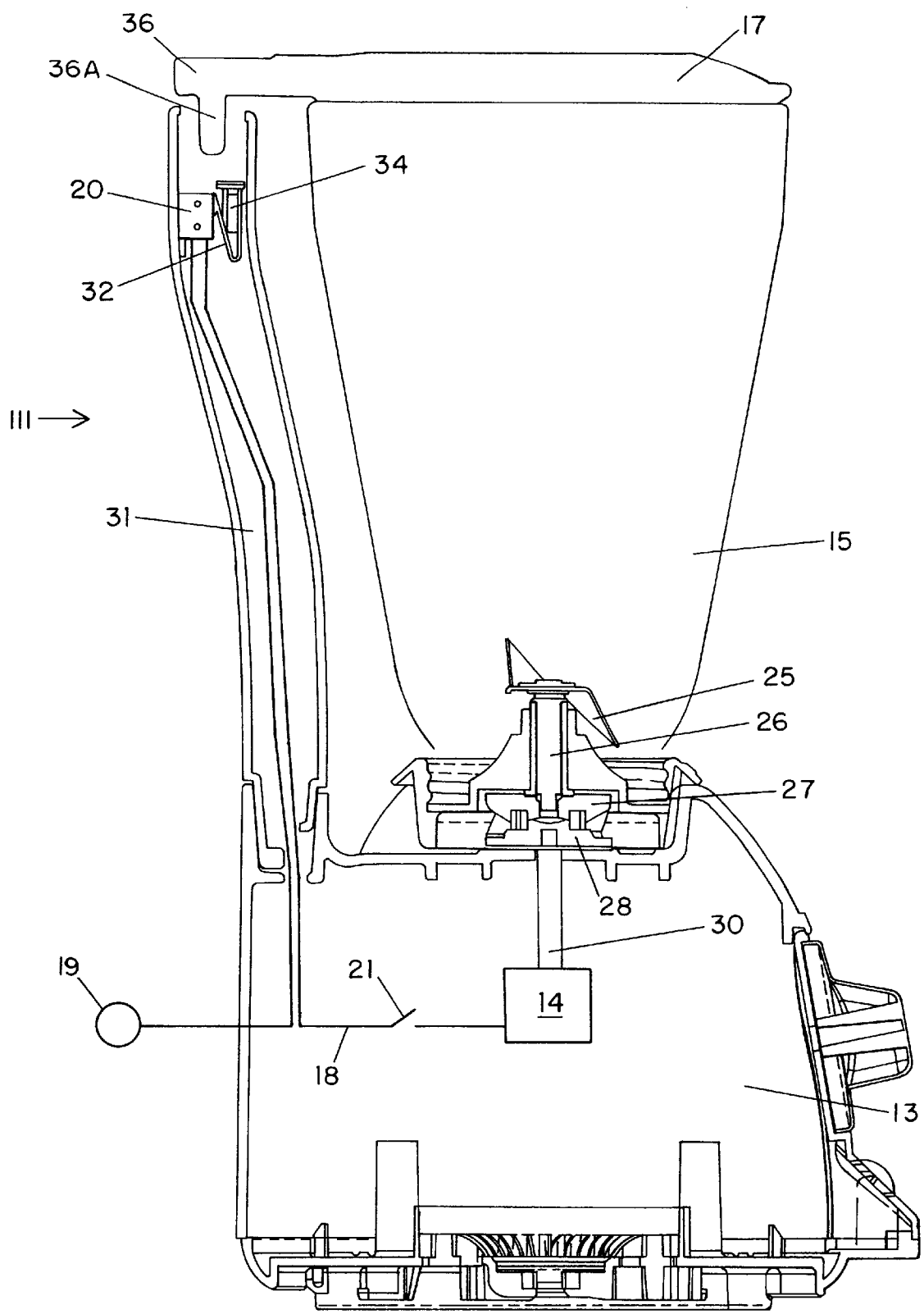
Figure 3:
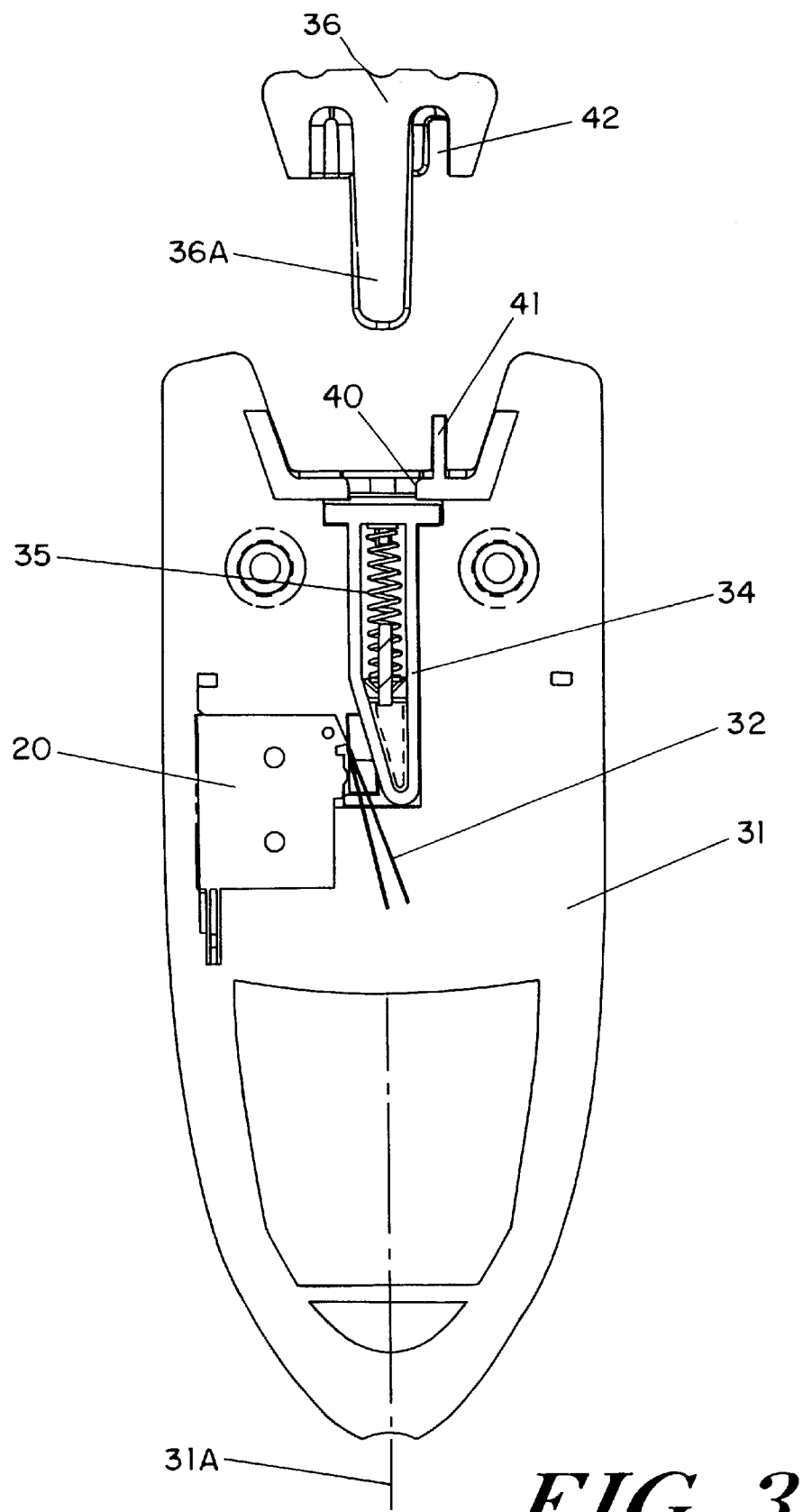
Figure 4:
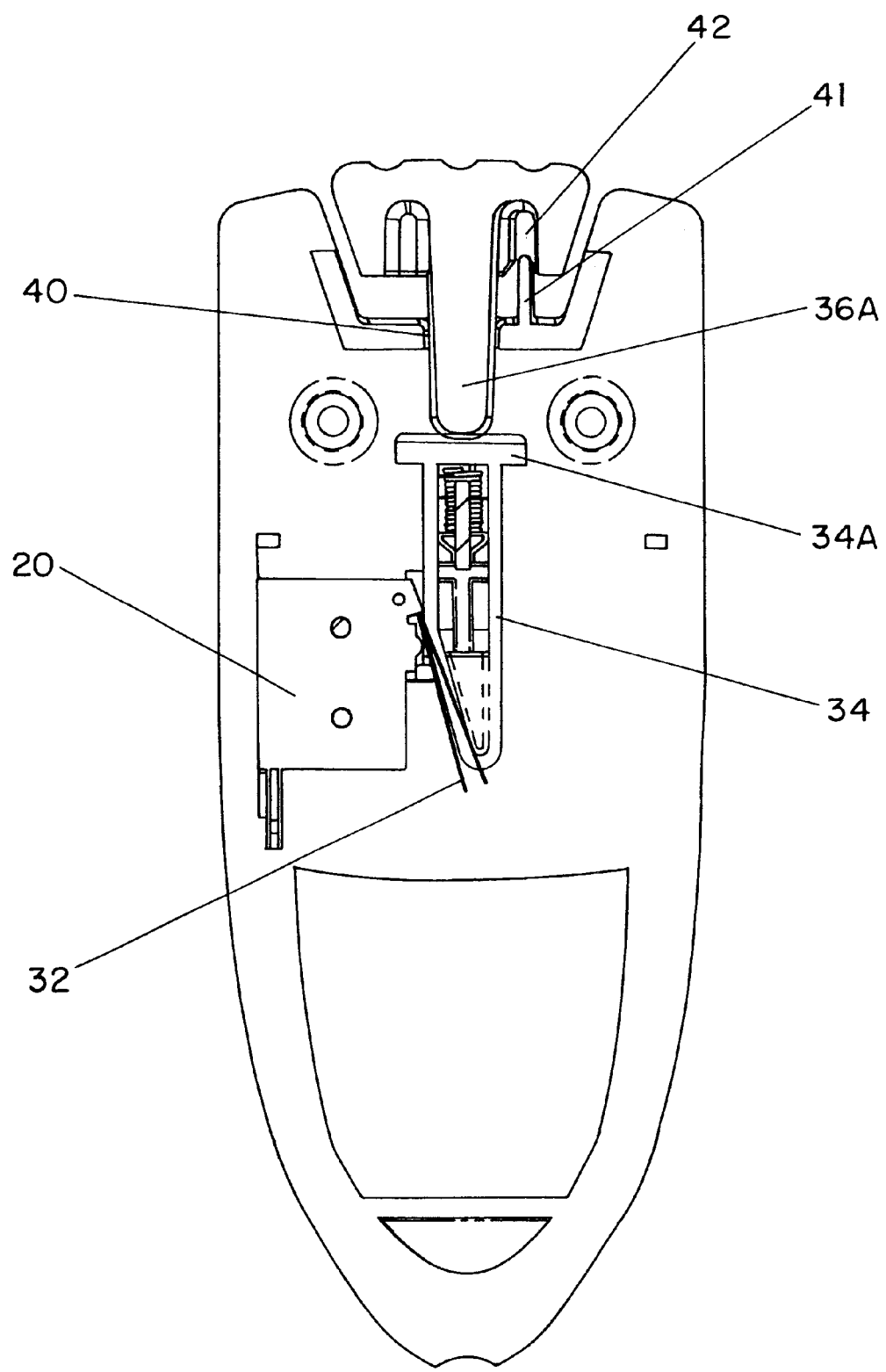
Figure 5:
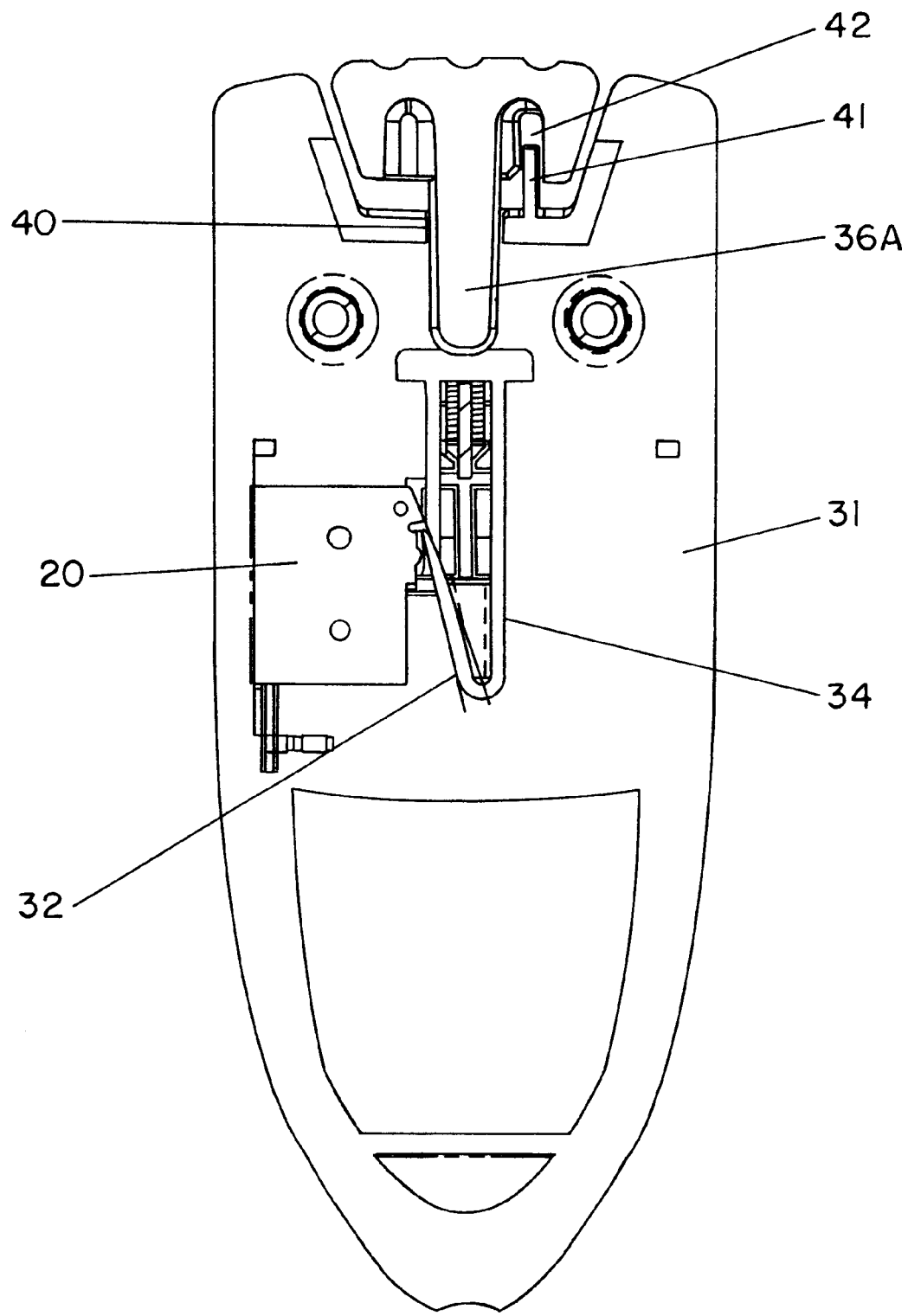
Figure 6:
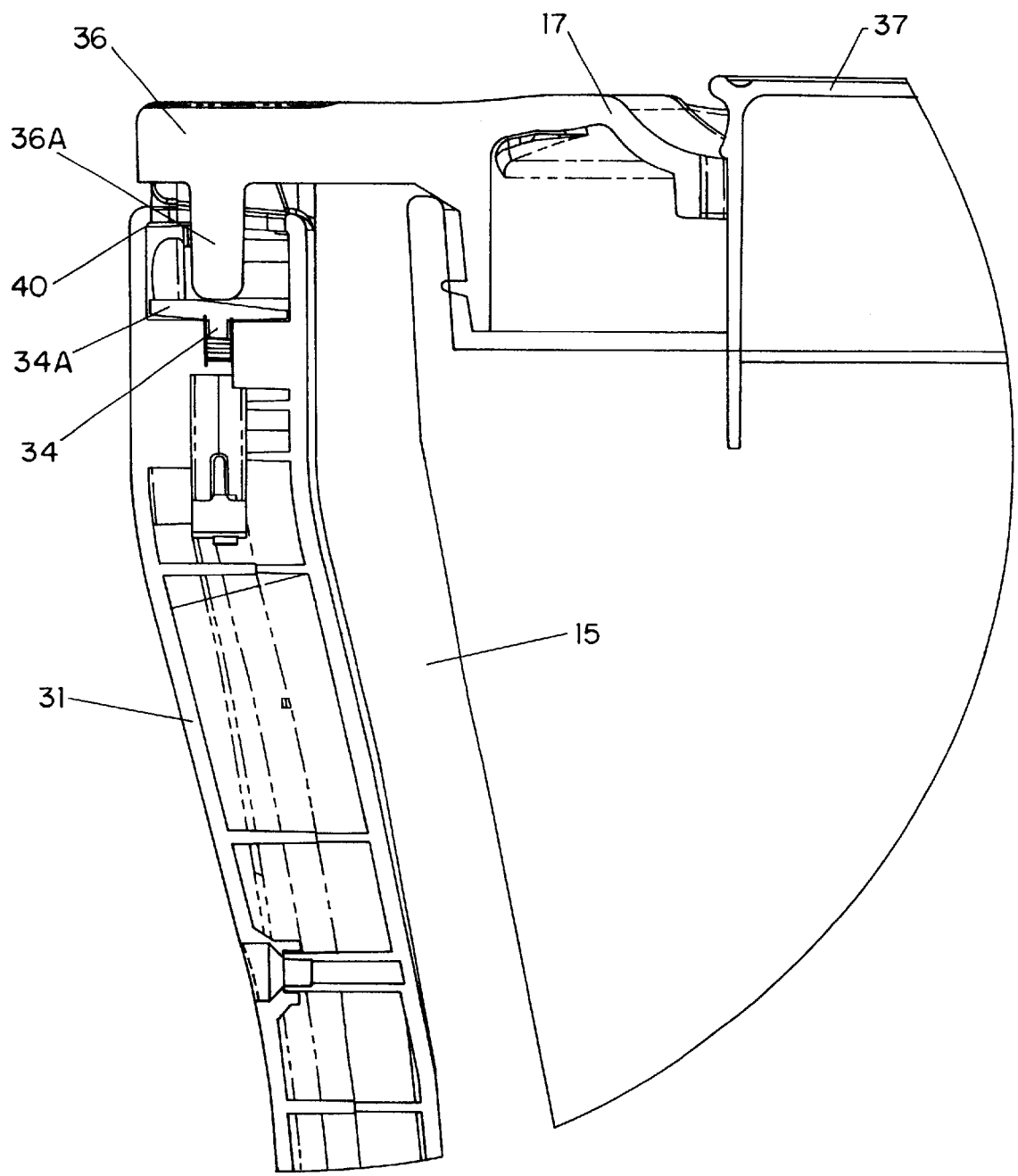

FIG. 1 is a side view of a blender,

FIG. 2 is a diagrammatic illustration of the motor and electrical drive connections of the blender, FIGS. 3 to 5 are enlarged views of a switch mechanism of the blender taken in the direction of arrow III of FIG. 2 and with a cover plate removed and showing the switch mechanism in an open condition, an initially closed condition and an overtravel closed condition respectively, and FIG. 6 is a part section, on an enlarged scale showing the engagement of an operating projection on the blender lid with an actuator.

DESCRIPTION OF THE PREFERRED EMBODIMENT

A blender 12 comprises a base unit 13 incorporating an electric motor 14, and a separable container in the form of a glass jug 15 having a handle 16 and a removable lid 17. The jug has a height greater than its largest diameter. The motor is connected by connection means indicated at 18 and an enabling/disabling interlock switch 20 to a power supply 19. Base unit 13 also includes an on/off/speed control switch 21 which is indicated diagrammatically in FIG. 2. An additional safety electronic control may be provided to ensure that the motor cannot be enabled if switch 20 is closed at a time when control switch 21 is closed.

As is conventional, rotatable blades 25 are located inside the lower part of the container and connected by a drive shaft 26, extending through the base of the container, to drive members 27 arranged to mesh with drive members 28 on a drive shaft 30 of the motor 14 when the container is located on the base unit 13.

The base unit includes a hollow upstanding projection or stalk 31 at one side. This projection extends to a height just above the level of or substantially level with the top of the container 15 without its lid 17. The switch 20 with a leaf spring connection arm 32 is located in the stalk 31 and connected in the control circuit between the motor 14 and the power supply 19. The switch 20 is normally in an open condition so that the motor is disabled since it does not receive power. A closed topped actuator 34 is mounted in the upper part of the stalk 31 for vertical movement and is biased upwardly, away from the spring arm 32, by an internal spring 35. However, the actuator 34 is movable downwardly to flex the spring arm 32 substantially horizontally, effectively closing the switch 20 to an enabled condition in which the motor can be connected to the power supply on closure of the on/off switch 21.

The lid 17 includes an arm 36 having a downwardly extending switch operating projection 36A such that when the container is located on the base unit and the lid is correctly engaged with the top of the container the projection 36A will engage with the plunger 34 and depress it to a position in which the switch 20 is moved to the enabled condition.

For the container and base unit to operate safely together the container must be made to a specified height relative to the projection 31.

Because we have found that where the container is made of glass the manufacturing tolerances result in the container having a height variation of up to 2 mm in either direction from the specified height, we have provided for the actuator 34 to be able to travel downwards at least about 4 mm passed the position in which it first operates the switch 20 to the enabled condition. It will be set to first enable the switch when the lid is at a height greater (by at least about 2 mm) than at its height when on a container of specified height. As seen in FIG. 3 the actuator is urged upwardly, by spring 35, to be out of contact with the switch arm 32 in the right hand of the two positions shown, which is the motor disabled condition of the switch 20. FIG. 4 shows the projection 36A entered into the top of the stalk 31 so that it has contacted the actuator 34 and moved it downwardly to a position where it first operates the switch arm 32 to the left of the positions shown so as to close the switch and move it to the motor enabling condition. FIG. 5 shows how the actuator 34 has moved 4 mm passed the first contact position of FIG. 4 without damaging the switch or preventing further downward movement of the projection 36A and lid.

As seen in FIG. 6 the head 34A of the actuator 34 extends on either side considerably beyond the normal contact point between the operating member 36A and the head 34A, in a horizontal direction in a plane containing the vertical axis 13A of the base unit 13 and the vertical axis 31 A of the projection 31. The upper part of the projection 31 defines a slot 40, also extending in this direction, for receiving the operating member 36A. The projection 31 also includes an upwardly projecting pin 41 for receipt in a slot 42 in the lid part 36, and extending parallel to the slot 40. We have found that where the container is made of glass the manufacturing tolerances result in the container having a lack of concentricity of up to 4 mm on either side of that specified so that the horizontal position of the operating member relative to the actuator may vary by up to 8 mm. The above arrangement allows for operative engagement of the operating member and actuator despite such variation while preventing such engagement unless the lid is at the correct angular position relative to the projection, that is the lid is located on the container.

The lid 17 has a removable central part 37 which can be removed when the motor is enabled but the aperture so formed in the lid is too small for the insertion of a hand anywhere near the blades. A cover plate 38 secured with tamper proof screw allows qualified access to the switch 20 and operating member 34.

What is claimed is:

1. An electric blender comprising a base unit having an electric motor and an upwardly extending projection, connecting means for connecting the motor to a power supply, a separate glass container incorporating rotatable blades and engageable with the base unit so that the motor, when connected to the power supply drives the blades, a lid for closing an open end of the container but separable therefrom, interlock switch means located in the projection and operable between conditions in which the motor is enabled or disabled with the interlock switch means biased to the motor disabled condition, a downwardly extending operating member integral with the lid and arranged to operate the interlock switch means to the motor-enabled condition in a safe condition when the separate glass container and the lid are correctly engaged with one another and the separate glass container of specified height is engaged with the base unit, an actuator movable substantially vertically within the projection and extending between the operating member and the interlock switch means in the safe condition, wherein the interlock switch means has a switch arm which comprises a flexible leaf spring movable substantially horizontally by direct interaction with the actuator on downward movement of the actuator, and wherein the substantially horizontal movement of the flexible leaf spring closes the interlock switch means to place the motor in a motor enabling condition.

2. A blender according to claim 1, wherein the actuator moves downwardly past a position in which it first contacts the flexible leaf spring to operate the interlock switch means to the motor-enabled condition.

3. A blender according to claim 2, wherein the lid comprises an upper surface directed away from the separate glass container when engaged with the separate glass container, the actuator first operating the interlock switch means when the lid is positioned such that a first plane including the upper surface is at least 2 mm beyond a second plane including the upper surface when the lid is fully engaged with the separate glass container and the actuator can move downwardly at least a further 4 mm.

4. A blender according to claim 1, wherein the projection extends substantially to the height of the top of the container when the container is located on the base unit.

5. A blender according to claim 1, wherein the operating member and the actuator are arranged to operatively engage with one another in the safe condition despite variation in their relative positions, of at least 6 mm, in a horizontal direction in a plane containing a vertical axis of the base unit and a vertical axis of the projection.

6. A blender according to claim 1, wherein the upwardly extending projection includes a projecting pin for receipt into a slot in the lid and arranged to ensure that the operating member can only be operatively engaged with the actuator at one relative angular position of the lid.

* * * * *